(12) United States Patent
Cho

(10) Patent No.: US 9,913,564 B2
(45) Date of Patent: Mar. 13, 2018

(54) ROBOT CLEANER AND CONTROL METHOD THEREOF

(71) Applicant: LG ELECTRONICS INC., Seoul (KR)

(72) Inventor: Minkyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/618,378

(22) Filed: Feb. 10, 2015

(65) Prior Publication Data

US 2015/0374191 A1    Dec. 31, 2015

(30) Foreign Application Priority Data

Jun. 26, 2014    (KR) .................. 10-2014-0078996

(51) Int. Cl.
*A47L 11/40* (2006.01)
*A47L 9/28* (2006.01)
*G05D 1/00* (2006.01)

(52) U.S. Cl.
CPC ............. *A47L 11/4011* (2013.01); *A47L 9/28* (2013.01); *A47L 9/2894* (2013.01); *G05D 1/0016* (2013.01); *G05D 1/0033* (2013.01); *A47L 2201/00* (2013.01); *A47L 2201/04* (2013.01); *G05D 2201/0203* (2013.01)

(58) Field of Classification Search
None
See application file for complete search history.

(56) References Cited

U.S. PATENT DOCUMENTS

| | | | |
|---|---|---|---|
| 5,682,313 A * | 10/1997 | Edlund et al. | 342/127 |
| 5,940,930 A | 8/1999 | Oh et al. | |
| 9,028,312 B1 * | 5/2015 | Wei et al. | 463/2 |
| 2005/0188493 A1 * | 9/2005 | Uehigashi | 15/319 |
| 2006/0177103 A1 * | 8/2006 | Hildreth | 382/107 |
| 2009/0024284 A1 * | 1/2009 | Bourbiel et al. | 701/45 |
| 2011/0183650 A1 * | 7/2011 | McKee | 455/413 |
| 2011/0292193 A1 * | 12/2011 | Wang et al. | 348/61 |

(Continued)

FOREIGN PATENT DOCUMENTS

| | | |
|---|---|---|
| CN | 1765595 A | 5/2009 |
| CN | 101628412 A | 1/2010 |

(Continued)

OTHER PUBLICATIONS

Hasnain, Hyder, "Wirelessly Controlled Arduino Tank Robot Overview", Published on Dec. 29, 2012, https://www.youtube.com/watch?v=d1KtI1upUpo.*

(Continued)

*Primary Examiner* — Krishnan Ramesh
(74) *Attorney, Agent, or Firm* — Dentons US LLP

(57) ABSTRACT

Disclosed are a robot cleaner and a control method thereof. The control method includes determining by a controller a connection between a user terminal and the robot cleaner and allowing communication between the user terminal and the robot cleaner, receiving a signal regarding a tilt direction of the user terminal by a wireless communication unit and conforming by the controller a tilting of the user terminal, and driving by the controller the robot cleaner in accordance with the received signal.

8 Claims, 6 Drawing Sheets

(56) References Cited

U.S. PATENT DOCUMENTS

| | | | |
|---|---|---|---|
| 2012/0265391 A1* | 10/2012 | Letsky | 701/25 |
| 2013/0056032 A1* | 3/2013 | Choe et al. | 134/18 |
| 2013/0207920 A1* | 8/2013 | McCann | G06F 3/0488 345/173 |
| 2014/0204226 A1* | 7/2014 | Murakami et al. | 348/208.1 |
| 2014/0247132 A1* | 9/2014 | Fukuma et al. | 340/815.45 |
| 2014/0265113 A1* | 9/2014 | Pines | 273/118 A |

FOREIGN PATENT DOCUMENTS

| | | |
|---|---|---|
| CN | 201936191 U | 8/2011 |
| CN | 103784079 A | 5/2014 |
| EP | 1752078 A1 | 2/2007 |
| EP | 2301401 A1 | 3/2011 |
| JP | 200685593 A | 3/2006 |
| KR | 100842566 B1 | 6/2008 |

OTHER PUBLICATIONS

Hydromea (Hyder Hasnain), "Wireless Tilt Controlled Tank Robot", Published Dec. 20, 2012, http://letsmakerobots.com/node/35484.*
Ake, "Bluestick Control", published Oct. 11, 2012, https://www.youtube.com/watch?v=GuwKxH2uxwM.*

* cited by examiner

FIG. 5
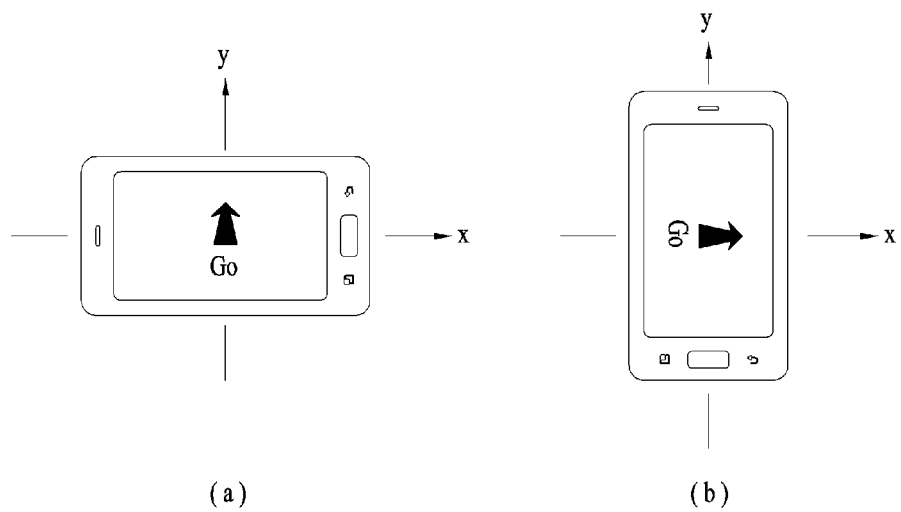
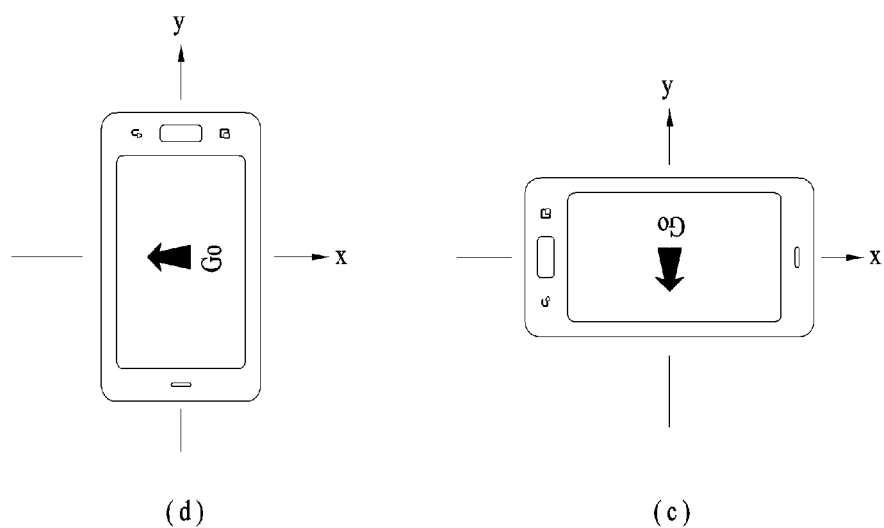

ROBOT CLEANER AND CONTROL METHOD THEREOF

Pursuant to 35 U.S.C. § 119(a), this application claims the benefit of Korean Patent Application No. 10-2014-0078996, filed on Jun. 26, 2014, which is hereby incorporated by reference as if fully set forth herein.

BACKGROUND OF THE INVENTION

Field of the Invention

The present invention relates to a robot cleaner and a control method thereof, and more particularly, to a robot cleaner, movement of which may be controlled by a user terminal, and a control method thereof.

Discussion of the Related Art

In general, a vacuum cleaner is an apparatus for cleaning an indoor floor or carpet. The vacuum cleaner sucks in air containing foreign substances from the outside by driving an air suction device including a motor and a fan provided within a cleaner main body and generating air suction force, separates the foreign substances from the air, collects the separated foreign substances, and then discharges purified air to the outside of the vacuum cleaner.

Vacuum cleaners are classified into a manually operated vacuum cleaner operated directly by a user and a robot cleaner autonomously performing cleaning without user manipulation.

The robot cleaner sucks in foreign substances, such as dust, while autonomously traveling within an area to be cleaned. Further, the robot cleaner may automatically perform cleaning of the cleaning area using obstacle sensors and other sensors provide therein or be manually operated using a remote controller connected to the robot cleaner wirelessly.

A user may use a user terminal to control the conventional robot cleaner. In this case, the user needs to control movement of the robot cleaner while viewing a screen of the user terminal after confirmation of the position and direction of the robot cleaner in an actual space. Therefore, the user alternately views the screen of the user terminal and the actual position of the robot cleaner so as to control the robot cleaner.

SUMMARY OF THE INVENTION

Accordingly, the present invention is directed to a robot cleaner and a control method thereof that substantially obviate one or more problems due to limitations and disadvantages of the related art.

An object of the present invention is to provide a robot cleaner, operation of which may be controlled without user viewing of a screen of a user terminal, and a control method thereof.

A further object of the present invention is to provide a robot cleaner which may be easily operated and a control method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of a robot cleaner includes determining by a controller a connection between a user terminal and the robot cleaner and allowing communication between the user terminal and the robot cleaner, receiving a signal regarding a tilt direction of the user terminal by a wireless communication unit and confirming by the controller a tilting of the user terminal and driving by the controller the robot cleaner in accordance with the received signal.

In another aspect of the present invention, a robot cleaner includes a wireless communication unit that receives signals transmitted from a user terminal having a tilt sensor, and a controller that controls operations of wheels according to signals received by the wireless communication unit, wherein the controller controls the wheels according to the signals transmitted from the user terminal so that the robot cleaner is operated according to the signals, and the signals are different according to tilt directions of the user terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5(a), FIG. 5(b), FIG. 5(c) and FIG. 5(d) are views illustrating setting according to rotated angles of the user terminal.

DETAILED DESCRIPTION OF THE INVENTION

Figure 1:
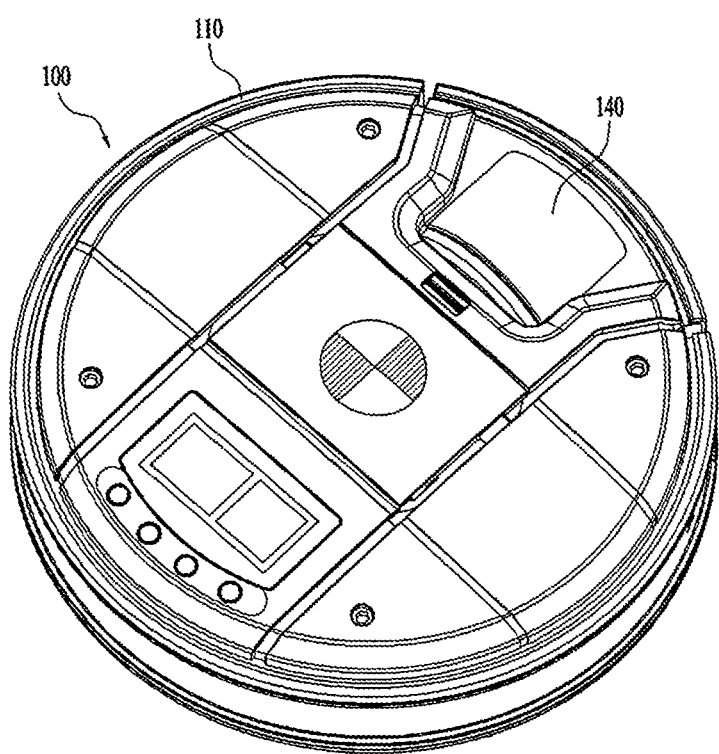
FIG. 1 is a perspective view illustrating a robot cleaner in accordance with one embodiment of the present invention.

Reference will now be made in detail to the preferred embodiments of the present invention, examples of which are illustrated in the accompanying drawings.

Herein, sizes or shapes of elements shown in the drawings may be exaggerated for clarity and convenience of description. Further, terms specifically defined in consideration of the configuration and functions of the present invention may be varied according to the intention of a user or an operator or usual practice. The definitions of these terms should be determined based on the whole content of this specification.

Figure 2:
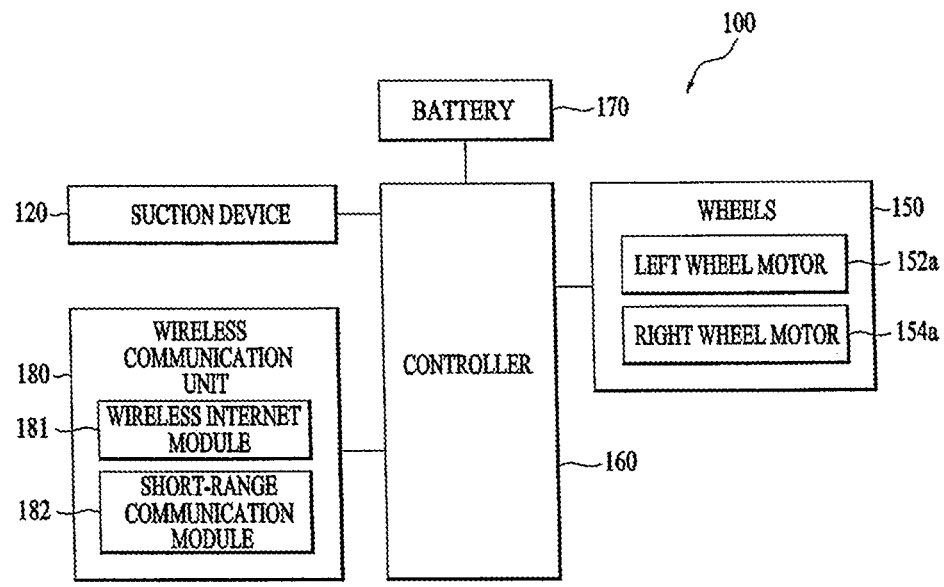
FIG. 2 is a block diagram of the robot cleaner in accordance with one embodiment of the present invention.

FIG. 1 is a perspective view illustrating a robot cleaner in accordance with one embodiment of the present invention and FIG. 2 is a block diagram of the robot cleaner in accordance with one embodiment of the present invention. Hereinafter, the robot cleaner in accordance with one embodiment of the present invention will be described with reference to FIGS. 1 and 2.

A robot cleaner 100 includes a cleaner main body 110 forming the external appearance of the robot cleaner 100, a suction device 120 installed within the cleaner main body 110, a suction nozzle sucking in dust from a floor by driving the suction device 120, and a dust collector 140 collecting foreign substances from air sucked in by the suction nozzle.

Here, the cleaner main body 110 of the robot cleaner 100 has a cylindrical shape having a small height relative to the diameter thereof, i.e., a flat cylindrical shape.

The suction device 120, the suction nozzle, and the dust collector 140 communicated with the suction nozzle are provided within the cleaner main body 110.

Further, sensors (not shown) sensing a distance from an indoor wall or obstacle, a bumper (not shown) absorbing impact during collision, and wheels 150 for moving the robot cleaner 100 are provided on the outer circumferential surface of the cleaner main body 110.

The wheels 150 include left and right driving wheels 150 respectively installed at both sides of the lower portion of the cleaner main body 10. The left and right driving wheels 150 are rotated by a left wheel motor 152a and a right wheel motor 154a controlled by a cleaner controller 160 and thus, the robot cleaner 100 performs cleaning of an indoor space while changing direction according to driving of the left wheel motor 152a and the right wheel motor 154a.

The cleaner controller 160 connected to various elements of the robot cleaner 100 and controlling operation of the robot cleaner 100 is provided at the front portion of the cleaner main body 110, and a battery 170 supplying power to the suction device 120, etc. is provided at the rear of the cleaner controller 160.

The suction device 120 generating air suction force is provided at the rear of the battery 170 and the dust collector 140 is detachably mounted at a dust collector mounting part provided at the rear of the suction device 120.

The suction nozzle is provided under the dust collector 140 and sucks in foreign substances together with air from a floor.

The suction device 120 is installed between the battery 170 and the dust collector 140 so as to be inclined and includes a motor (not shown) electrically connected to the battery 170 and a fan (not shown) connected to a rotary shaft of the motor and forcibly generating flow of air.

The suction nozzle is exposed to the outside from the lower portion of the cleaner main body 110 through an opening (not shown) formed on the bottom of the cleaner main body 110, and thus contacts an indoor floor.

In addition to the above-described elements, the robot cleaner 100 may include a wireless communication unit 180 performing wireless communication with an external apparatus.

The wireless communication unit 180 may include one or more modules enabling wireless communication between the robot cleaner 100 and an external apparatus or between the robot cleaner 100 and an external network. For example, the wireless communication unit 180 may include a wireless Internet module, a short-range communication module, etc.

The wireless Internet module is a module for wireless Internet connection and may be installed at the inside or outside of the robot cleaner 100. The short-range communication module is a module for short-range communication.

Figure 3:
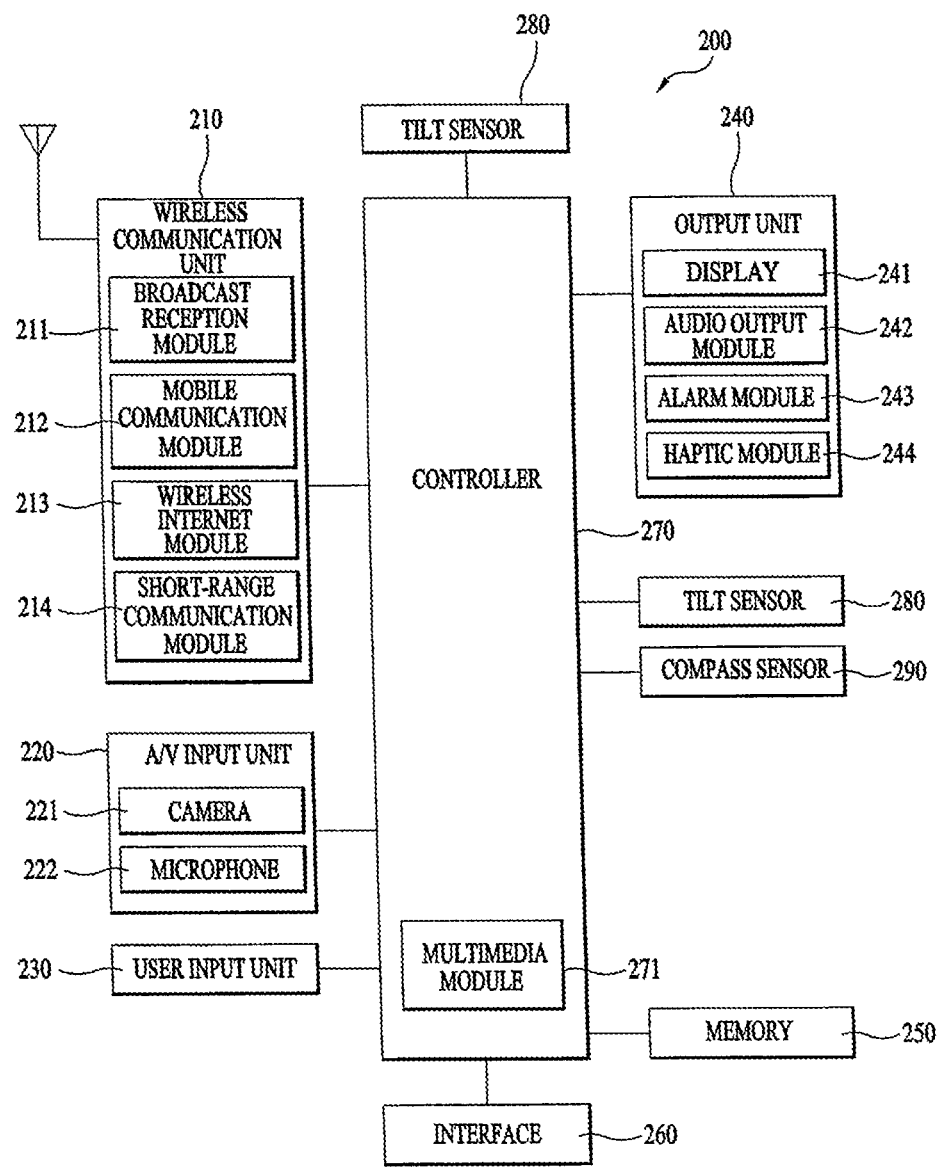
FIG. 3 is a block diagram of a user terminal communicated with the robot cleaner in accordance with one embodiment of the present invention.

FIG. 3 is a block diagram of a user terminal communicated with the robot cleaner in accordance with one embodiment of the present invention.

A user terminal 200 in accordance with one embodiment of the present invention is a device remotely connected to the robot cleaner 100 and controlling driving of the robot cleaner 100. For example, a portable terminal, a smartphone, a personal digital assistant (PDA), a portable multimedia player (PMP), etc. may be used as the user terminal 200.

Hereinafter, for convenience of description, a smartphone used as the user terminal 200 of the robot cleaner 100 will be described.

The user terminal 200 may include a wireless communication unit 210, an audio/video (A/V) input unit 220, a user input unit 230, an output unit 240, a memory 250, an interface 260, a terminal controller 270, and a power supply unit 280. The elements shown in FIG. 3 are non-essential and the user terminal 200 may include a larger number of elements or a smaller number of elements than these elements.

The wireless communication unit 210 may include one or more modules enabling wireless communication between the user terminal 200 and a wireless communication system or between the user terminal 200 and a network in which the user terminal 200 is located. For example, the wireless communication unit 210 may include a broadcast reception module 211, a mobile communication module 212, a wireless Internet module 213, a short-range communication module 214, etc.

The mobile communication module 212 transmits/receives a wireless signal to/from at least one of a base station, an external terminal, and a server on a mobile communication network. The wireless signal may include a voice call signal, a video call signal, or various shapes of data according to character/multimedia message transmission and reception.

The wireless Internet module 213 is a module for wireless Internet connection and may be installed at the inside or outside of the user terminal 200. As wireless Internet technology, wireless LAN (WLAN) (Wi-Fi), wireless broadband (WiBro), world interoperability for microwave access (Wi-Max), high speed downlink packet access (HSDPA), etc. may be used.

The short-range communication module 214 is a module for short-range communication. As short-range communication technology, Bluetooth, radio frequency identification (RFID), infrared data association (IrDA), ultra wideband (UWB), ZigBee, etc. may be used.

The A/V input unit 220 serves to input an audio signal or a video signal and may include a camera 221 and a microphone 222. The camera 221 processes a video frame, such as a still image or a moving picture acquired by an image sensor in a video call mode or a photographing mode. The processed video frame may be displayed on a display 241.

The video frame processed by the camera 221 may be stored in the memory 250 or transmitted to the outside through the wireless communication unit 210. Two or more cameras 221 may be provided according to environments.

The microphone 222 receives an external audio signal in a call mode, a recording mode, or a voice recognition mode and processes the external audio signal into electrical voice data. In case of the call mode, the processed voice data may be converted into a type transmittable to a mobile communication base station through the mobile communication module 212 and then output. Various noise removal algorithms to remove noise generated during a process of inputting the external audio signal may be implemented in the microphone 222.

The user input unit 230 generates input data allowing a user to control operation of the user terminal 200. The user input unit 230 may include a keypad, a dome switch, a touch pad (constant pressure type/electrostatic type), a jog wheel, a jog switch, etc.

The output unit 240 generates output regarding visual, auditory, or tactile senses and may include the display 241, an audio output module 242, an alarm unit 243, and a haptic module 244.

The display 241 displays (outputs) information processed by the user terminal 200. For example, if the user terminal 200 is in the call mode, the display 241 displays a user interface (UI) or a graphical user interface (GUI) regarding a call. If the user terminal 200 is in the video call mode or the photographing mode, the display 241 displays photographed and/or received images, the UI, or the GUI.

The display 241 may include at least one of a liquid crystal display (LCD), a thin film transistor-liquid crystal display (TFT-LCD), an organic light emitting diode (OLED), a flexible display, and a 3D display.

Two or more displays 241 may be provided according to implementation types of the user terminal 200. For example, a plurality of displays 241 may be arranged on one surface of the user terminal 200 so as to be separated from each other or to be integrated into one unit, or be respectively arranged on different surfaces.

If the display 241 and a sensor sensing a touch operation (hereinafter, referred to as a "touch sensor") are form a layered structure (hereinafter, referred to as a "touchscreen"), the display 241 may be used as an input device as well as the output device. For example, the touch sensor may be formed in the type of a touch film, a touch sheet, or a touch pad.

The touch sensor may convert change of pressure applied to a specific region of the display 241 or capacitance generated from a specific region of the display 241 into an electrical input signal. The touch sensor may detect a pressure during touch as well as a touch position or touch dimensions.

If there is touch input sensed by the touch sensor, (a) signal(s) corresponding thereto are transmitted to a touch controller. The touch controller processes the signal(s) and then transmits corresponding data to the terminal controller 270. Thereby, the terminal controller 270 may recognize which region of the display 241 is touched.

The audio output module 242 may output audio data received from the wireless communication unit 210 or stored in the memory 250 in the call signal reception mode, the call mode, the recording mode, the voice recognition mode, and the broadcast reception mode. The audio output module 242 may output an audio signal regarding a function performed by the user terminal 200 (for example, a call signal reception sound, a message reception sound, etc.) Such an audio output module 242 may include a receiver, a speaker, a buzzer, etc.

The alarm unit 243 outputs a signal indicating generation of an event from the user terminal 200. For example, events generated from the user terminal 200 may include call signal reception, message reception, key signal input, touch input, etc. The alarm unit 243 may output a signal of other types, for example, a signal indicating generation of an event through vibration, in addition to a video signal or an audio signal. Since the video signal or the audio signal may be output through the display 241 or the voice output module 242, the display 241 or the voice output module 242 may be regarded as parts of the alarm unit 243.

The haptic module 154 may generate various haptic effects which may be felt by a user. As a representative example of haptic effects generated by the haptic module 244, there is vibration. The intensity and pattern of vibration generated by the haptic module 244 may be controlled. For example, different vibrations may be combined and output, or be sequentially output.

The memory 250 may store a program for operating the terminal controller 270 or temporarily store input/output data (for example, a phone book, a message, a still image, a moving picture, etc.). The memory 250 may store data regarding vibration and sound of various patterns output when touch on the touchscreen is input.

The memory 250 may include at least one storage medium from among a flash memory, a hard disk, a multimedia card, a micro card, a card type memory (for example, a SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. The user terminal 200 may be operated in connection with web-based storage performing the storage function of the memory 250 over the Internet.

The interface 260 serves as a passage with all external apparatuses connected to the user terminal 200. The interface 260 receives data or power from an external apparatus and transmits the received data or power to the respective elements of the user terminal 200, or transmits data from the user terminal 200 to an external apparatus. For example, the interface 260 may include a wired/wireless headset port, an external charger port, a wired/wireless data port, a memory card port, a port for connection to a device having an identity module, an audio input/output (I/O) port, a video input/output (I/O) port, an earphone port, etc.

The identity module is a chip in which various pieces of information to authenticate the usage right of the user terminal 200 are stored and may include a user identity module (UIM), a subscriber identity module (SIM), a universal subscriber identity module (USIM), etc. The device having the identity module (hereinafter, referred to as an "identity device") may be manufactured as a smart card. Therefore, the identity device may be connected to the user terminal 200 through a port.

The terminal controller 270 generally controls the overall operation of the user terminal 200. For example, the terminal controller 270 performs control and processing regarding voice call, data communication, video call, etc. The terminal controller 270 may include a multimedia module 271 to reproduce multimedia. The multimedia module 271 may be provided at the inside of the terminal controller 270 or provided separately from the terminal controller 270.

The terminal controller 270 may perform pattern recognition processing in which writing input or drawing input performed on the touchscreen may be recognized as a text or an image.

The power supply unit 280 receives external power or internal power under control of the terminal controller 270 and supplies power required to operate the respective elements to the elements.

The user terminal 200 may include a compass sensor 290 sensing the rotated direction of the user terminal 200. The compass sensor 290 may recognize a direction. The rotated direction of the user terminal 200 means that a viewing direction of a user holding the user terminal 200 is changed into various directions, i.e., such as north, south, each and west. Therefore, the compass sensor 290 may detect the rotated direction of the user terminal 200.

The compass sensor 290 may transmit information regarding the rotated direction of the user terminal 200 to the terminal controller 270.

The user terminal 200 may include a tilt sensor 280 sensing a tilt direction of the user terminal 200 and an acceleration value when the user terminal 200 is tilted. Here, the tilt sensor 280 may include a gyro sensor or an acceleration sensor.

The tilt sensor 280 may transmit the tilt direction of the user terminal 200 and the acceleration value when the user terminal 200 is tilted to the terminal controller 270.

The tilt sensor 280 and the compass sensor 290 are elements which are widely used in general user terminals and a detailed description thereof will thus be omitted.

Figure 4:
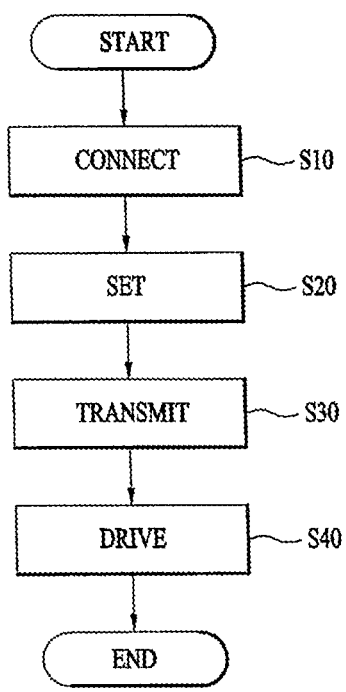
FIG. 4 is a flowchart illustrating a control method of the robot cleaner in accordance with one embodiment of the present invention.

FIG. 4 is a flowchart illustrating a control method of the robot cleaner in accordance with one embodiment of the present invention, FIGS. 5(a) to 5(d) are views illustrating setting according to rotated angles of the user terminal, and FIGS. 6(a) and 6(b) are views illustrating operating signals of the robot cleaner according to tilt directions of the user terminal. Hereinafter, a control method of the robot cleaner will be described.

First, the user terminal 200 may be connected to the robot cleaner 100 so as to perform communication between the robot cleaner 100 and the user terminal 200 (Operation S10).

Here, the wireless communication unit 210 of the user terminal 200 may be connected to the wireless communication unit 180 of the robot cleaner 100 wirelessly.

In more detail, the wireless communication unit 180 of the robot cleaner 100 may be operated as a WiFi dongle in a soft AP mode and serve as a kind of server.

An application installed in the user terminal 200 may control a WiFi function and attempt to perform connection to the wireless communication unit 180 of the robot cleaner 100 operated in the AP mode.

When AP connection has been completed, TCP connection through a set protocol (an IP address, a port number, etc.) may be carried out.

When TCP connection has been completed, the user terminal 200 and the robot cleaner 100 may maintain connection while transmitting/receiving secession messages to/from each other.

A picture guiding a manipulation method of the user terminal 200 may be provided to a user when the robot cleaner 100 moves forward through the display 241 of the user terminal 200. As exemplarily shown in FIGS. 5(a) to 5(d), an arrow in a forward movement direction may be displayed on the display 241 and thus, when the user terminal 200 is tilted in the corresponding direction, the robot cleaner 100 may move straight forward.

Since the picture guiding straight movement of the robot cleaner 100 is provided to the user, the user may easily control the operation of the robot cleaner 100.

Further, the user holding the user terminal 200 may rotate in place or move to other place.

If the user terminal 200 is rotated and the viewing direction of the user terminal 200 is changed, a signal generated in the tilt direction of the user terminal 200 may vary according to the rotated angles of the user terminal 200 (Operation S20).

Here, the signal may be set such that, when the user terminal 200 is tilted in the same direction based on the shape of the user terminal, the robot cleaner 100 is operated in the same manner.

This will be described in more detail with reference to FIGS. 5(a) to 5(d). FIG. 5(a) illustrates the user terminal rotated by an angle of 0 degrees, FIG. 5(b) illustrates the user terminal rotated by an angle of 90 degrees, FIG. 5(c) illustrates the user terminal rotated by an angle of 180 degrees, and FIG. 5(d) illustrates the user terminal rotated by an angle of 270 degrees.

Information regarding whether or not the user terminal 200 is rotated, as exemplarily shown in FIGS. 5(a) to 5(d), may be sensed by the compass sensor 290 installed in the user terminal 200. The compass sensor 290 may sense directions, such as north, south, each and west, and thus recognize whether or not the user terminal 200 is rotated and the rotated angle of the user terminal 200.

For example, a tilt value generated by tilting the user terminal 200 in the y-axis direction and a tilt value generated by tilting the user terminal 200 in the x-axis direction may be generated, as exemplarily shown in FIG. 5(a). In addition, various pieces of information according to the tilt directions of the user terminal 200 may be generated.

Since FIG. 5(b) illustrates the user terminal rotated by an angle of 90 degrees, differently from FIG. 5(a), a tilt value generated by tilting the user terminal 200 in the x-axis direction may be converted so as to match a tilt value generated by tilting the user terminal 200 in the y-axis direction in FIG. 5(a). In the same manner, a tilt value generated by tilting the user terminal 200 in the y-axis direction may be converted so as to match a tilt value generated by tilting the user terminal 200 in the x-axis direction in FIG. 5(a).

Since FIG. 5(c) illustrates the user terminal rotated by an angle of 180 degrees, differently from FIG. 5(a), a tilt value generated by tilting the user terminal 200 in the x-axis direction may be converted so as to match a tilt value generated by tilting the user terminal 200 in the −x-axis direction in FIG. 5(a). In the same manner, a tilt value generated by tilting the user terminal 200 in the y-axis direction may be converted so as to match the tilt value generated by tilting the user terminal 200 in the −y-axis direction in FIG. 5(a).

Since FIG. 5(d) illustrates the user terminal rotated by an angle of 270 degrees, differently from FIG. 5(a), a tilt value generated by tilting the user terminal 200 in the x-axis direction may be converted so as to match a tilt value generated by tilting the user terminal 200 in the -y-axis direction in FIG. 5(a). In the same manner, a tilt value generated by tilting the user terminal 200 in the y-axis direction may be converted so as to match the tilt value generated by tilting the user terminal 200 in the x-axis direction in FIG. 5(a).

That is, in the present invention, even if the user having the user terminal 200 moves around and thus, the viewing direction of the user terminal 200 is changed, when the user terminal 200 is tilted in the same direction based on the shape of the user terminal 200, the user terminal 200 may generate information causing the same operation of the robot cleaner 100.

For this purpose, the compass sensor 290 may sense whether or not the user terminal 200 is rotated and change information regarding the tilt direction generated from the tilt sensor 280.

When the user tilts the user terminal 200, tilting of the user terminal 200 may be confirmed and a signal regarding the tilt direction of the user terminal 200 may be transmitted to the robot cleaner 100 (Operation S30).

One of 8 signals controlling different operations of the robot cleaner 100 may be transmitted to the robot cleaner 100 according to the tilt direction of the user terminal 200.

Figure 6:
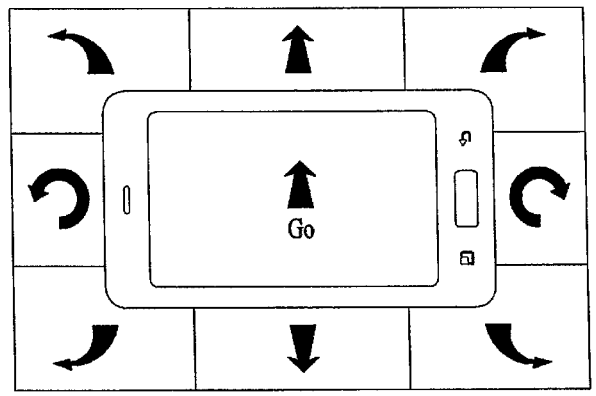
FIG. 6(a), and FIG. 6(b) are views illustrating operating signals of the robot cleaner according to tilt directions of the user terminal.
Figure 6:
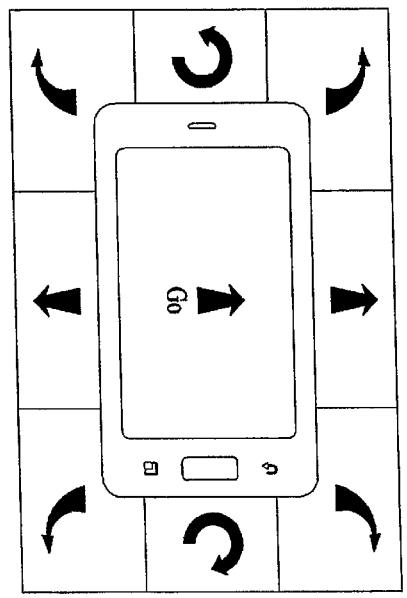

As exemplarily shown in FIG. 6(*a*), 8 different signals may be generated according to tilt directions of the user terminal 200. Some of the signals may move the robot cleaner 100 forward or backward in the straight direction. Some of the signals may move the robot cleaner 100 forward or backward in the left diagonal direction or the right diagonal direction while rotating the robot cleaner 100 by a designated angle. Some of the signals may rotate the robot cleaner 100 leftward or rightward.

With reference to FIG. 6(*a*), when the user tilts the user terminal 200 upward in the same direction as the direction of an arrow marked 'Go', the tilt sensor 280 may sense tilting of the user terminal 200 in the corresponding direction. The user sensor 200 may transmit corresponding information to the robot cleaner 100 and the robot cleaner 100 may receive a related signal and move straight forward.

When the user tilts the user terminal 200 downward in the opposite direction to the direction of the arrow marked 'Go', the tilt sensor 280 may sense tilting of the user terminal 200 in the corresponding direction. The user sensor 200 may transmit corresponding information to the robot cleaner 100 and the robot cleaner 100 may receive a related signal and move straight backward.

The user may tilt the user terminal 200 right and upward in the diagonal direction. In this case, a signal moving the robot cleaner 100 right and upward in the diagonal direction may be transmitted to the robot cleaner 100.

On the other hand, the user may tilt the user terminal 200 left and upward in the diagonal direction. In this case, a signal moving the robot cleaner 100 left and upward in the diagonal direction may be transmitted to the robot cleaner 100.

The user may tilt the user terminal 200 right and downward in the diagonal direction. In this case, a signal moving the robot cleaner 100 right and downward in the diagonal direction may be transmitted to the robot cleaner 100.

The user may tilt the user terminal 200 left and downward in the diagonal direction. In this case, a signal moving the robot cleaner 100 left and downward in the diagonal direction may be transmitted to the robot cleaner 100.

In addition, the user may tilt the user terminal 200 in the rightward direction. In this case, the robot cleaner 100 may be rotated rightward. The robot cleaner 100 may be rotated in place in the clockwise direction.

Further, the user may tilt the user terminal 200 in the leftward direction. In this case, the robot cleaner 100 may be rotated leftward. The robot cleaner 100 may be rotated in place in the counterclockwise direction.

FIG. 6(*b*) is a view illustrating the user terminal 200 rotated by 90 degrees in the clockwise direction from the state of FIG. 6(*a*). In the same manner as shown in FIGS. 5(*a*) to 5(*d*), even if a user manipulates the user terminal 200 in the rotated state, the user may equally manipulate the user terminal 200 so as to perform the same operation of the robot cleaner 100 based on the mark 'Go' and arrows displayed on the display 241 of the user terminal 200.

For reference, in the state in which the user terminal 200 is rotated, as exemplarily shown in FIG. 6(*b*), when the user terminal 200 is tilted in the same direction as the direction of the arrow marked 'Go', the robot cleaner 100 may receive a signal indicating straight movement in the forward direction.

The tilt sensor 280 may sense the tilt direction of the user terminal 200. Further, the tilt sensor 280 may sense an acceleration value when the user terminal 200 is tilted.

In this case, the controller 160 of the robot cleaner 100 may judge whether or not the acceleration value is greater than a set reference value, and control operation of the robot cleaner 100. Of course, the controller 270 of the user terminal 200 may judge whether or not the value measured by the tilt sensor 280 is greater than a set value and determine whether or not a signal is transmitted to the robot cleaner 100.

A signal may be discontinuously transmitted from the user terminal 200 to the robot cleaner 100. That is, the user may tilt the user terminal 200 by various angles and information regarding the angles of the user terminal 200 tilted by the user may be transmitted to the robot cleaner 100 at designated time intervals.

When the robot cleaner 100 receives the related signal, the robot cleaner 100 is differently operated according to the received signal (Operation S40).

When the signal is transmitted from the user terminal to the robot cleaner 100 at designated time intervals, the controller 160 of the robot cleaner 100 may operate the wheels 150 of the robot cleaner 100 based on the corresponding signal at the designated time intervals.

As apparent from the above description, in a robot cleaner and a control method thereof in accordance with one embodiment of the present invention, a user may control the position of the robot cleaner while confirming only the position of the robot cleaner without viewing of a screen of a user terminal and thus easily operate movement of the robot cleaner. That is, when the user controls operation of the robot cleaner, the user does not need to alternately view the user terminal and the robot cleaner and may thus easily operate the robot cleaner.

Further, even if the user terminal is rotated and the direction of the user terminal is changed, the robot cleaner is regularly operated according to tilting of the robot cleaner based on the user terminal and thus, the user may easily operate the robot cleaner.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A control method of a robot cleaner comprising:
   determining by a controller a connection between a user terminal and the robot cleaner, and allowing communication between the user terminal and the robot cleaner;
   sensing by a tilt sensor a tilt direction of the user terminal and generating by the controller a signal, the signal being different signals for the tilt direction of the user terminal according to rotated angles of the user terminal;
   transmitting by a wireless communication unit the signal regarding the tilt direction of the user terminal,
   wherein, in the connecting of the user terminal to the robot cleaner, a picture guiding a manipulation method of the user terminal when the robot cleaner moves forward is provided as eight different arrows on a display of the user terminal,
   wherein, in the sending of the signal, one of eight signals controlling different operations of the robot cleaner according to corresponding tilt directions of the user terminal is transmitted to the robot cleaner, wherein some of the signals serve to move the robot cleaner forward or backward in a set direction, and some of the signals serve to move the robot cleaner forward or backward in a left diagonal direction or a right diagonal direction from the set direction while rotating the robot cleaner by a designated angle, and some of the signals serve to rotate the robot cleaner in place in the clockwise direction or in the counterclockwise direction, wherein, when the robot cleaner is moved by the signal, one of the eight arrows corresponding to the signal is displayed on the display of the user terminal; and sensing by a compass sensor on whether the user terminal has rotated with respect to a compass direction and changing, by the controller, information regarding the tilt direction of the user terminal sensed by the tilt sensor so that the signal generated by the tilt direction of the user terminal after a change in the compass direction is the same as the signal generated by the tilt direction of the user terminal before the change in the compass direction relative to the picture guiding the manipulation method, and the robot cleaner does not adjust its position during a compass direction change of the user terminal.

2. The control method according to claim 1, wherein the rotated angle of the user terminal is defined as a rotated angle of the user terminal with a central vertical axis of the user terminal as the rotation axis.

3. The control method according to claim 1, wherein the tilting of the user terminal is defined as a state in which the user terminal is tilted from a standard plane that is parallel to the ground surface.

4. The control method according to claim 1, wherein the transmission of the signal is performed at designated time intervals.

5. The control method according to claim 1, wherein the signal is generated when the user terminal is tilted at an acceleration value greater than a set reference value.

6. A robot cleaner comprising:
a wireless communicator that receives signals transmitted from a user terminal having a tilt sensor; and
a controller that controls operations of wheels according to signals received by the wireless communication unit, wherein:
the controller determines different signals for the tilt direction of the user terminal generated, according to rotated angles of the user terminal; and
the controller controls the wheels according to the signals transmitted from the user terminal so that the robot cleaner is operated according to the signals;
wherein a picture guiding a manipulation method of the user terminal when the robot cleaner moves forward is provided as eight different arrows on a display of the user terminal during driving of the robot cleaner,
wherein some of the signals serve to move the robot cleaner forward or backward in a set direction, some of the signals serve to move the robot cleaner forward or backward in a left diagonal direction or a right diagonal direction from the set direction while rotating the robot cleaner by a designated angle, and some of the signals serve to rotate the robot cleaner in place in the clockwise direction or in the counterclockwise direction, and
wherein, when the robot cleaner is moved by the signal, one of the eight arrows corresponding to the signal is displayed on the display of the user terminal,
wherein the user terminal further having a compass sensor that senses whether the user terminal has rotated with respect to a compass direction and changing, by the controller, information regarding the tilt direction of the user terminal sensed by the tilt sensor so that the signal generated by the tilt direction of the user terminal after a change in the compass direction is the same as the signal generated by the tilt direction of the user terminal before the change in the compass direction relative to the picture guiding the manipulation method, and the robot cleaner does not adjust its position during a compass direction change of the user terminal.

7. The robot cleaner according to claim 6, wherein:
the rotated angle of the user terminal is defined as a rotated angle of the user terminal with a central vertical axis of the user terminal as the rotation axis; and
the tilting of the user terminal is defined as a state in which the user terminal is tilted from a standard plane that is parallel to the ground surface.

8. The robot cleaner according to claim 6, wherein the signals are generated when the user terminal is tilted at an acceleration value greater than a predetermined reference value.

* * * * *